Patented Oct. 9, 1951

2,570,480

UNITED STATES PATENT OFFICE 2,570,480

PURIFICATION OF TRIARYL PHOSPHATES

Donald F. Pontz, Midland, Mich., assignor to The Dow Chemical Company, Midland, Mich., a corporation of Delaware No Drawing. Application June 20, 1949, Serial No. 100,309

4 Claims. (Cl. 260—461)

This invention concerns a new method of isolating and purifying certain crude triaryl phosphates.

In the conventional process for making triaryl phosphates, three mols of a phenol, molten or in solution, are condensed at elevated temperature with approximately one mol of phosphorus oxychloride in the presence of a small proportion of certain metals or their halides as catalyst (cf. British Patent 203,820). The hot reaction mixture, after being blown with air to remove most of the hydrogen chloride formed in the condensation, is if necessary thinned with a solvent, such as orthodichlorobenzene, and washed with water to remove the catalyst and other water-soluble impurities. After distilling off any solvent added, the triaryl phosphate is left in a crude state.

In the case of the solid triarylphosphates, the crude product is purified by elaborate crystallization from alcoholic media. This technique, while effective, necessitates installation of a solvent recovery system and is both expensive and time-consuming.

It is therefore the principal object of the present invention to provide a process for purifying crude solid triaryl phosphates which replaces the crystallization steps of prior practice and eliminates the use of expensive solvents.

According to the invention, a crude molten triaryl phosphate may be purified by dispersing it in water at a temperature above the solidification temperature of the crude compound and containing a small proportion of an emulsifying agent. The resulting dispersion is then cooled to a temperature below the solidification temperature, thus causing the compound to separate from the dispersion as a discrete solid phase. This phase is substantially free of water soluble and oily impurities, which remain dissolved or dispersed in the aqueous medium. The solidified product may then be recovered from the cooled dispersion, as by filtration, and then washed with water and dried.

This procedure, which is simple, rapid and inexpensive, is highly effective in removing most of the impurities from crude triaryl phosphates. The product of a single application of the process is usually sufficiently pure to be acceptable in most applications of triaryl phosphates. If a product of greater purity is required, the process may be repeated one or more times with a given batch of material. Optionally, it may be combined with an alcohol recrystallization of the type employed heretofore, except that the procedure for the latter may be greatly simplified since the main burden of purification is carried by the new treatment.

Typical of compounds which are successfully purified by this invention are triphenyl phosphate, triparacresyl phosphate, tri-paratertiary-butylphenyl phosphate, tri-parachlorophenyl phosphate, di - paracresyl orthochlorophenyl phosphate, tri-metaxenyl phosphate, paraxenyl diphenyl phosphate and phenyl di-paraxenyl phosphate.

The emulsifying agent used in the process may be any of several surface-active or wetting agents capable of suspending the oily materials in water. Synthetic detergents, such as the hymolal salts, e. g. sodium lauryl sulfate, and the aryl alkyl sulfonates, which form no precipitate in hard waters or in aqueous acid solution are preferred. In general, the concentration of emulsifying agent in the water should be between about 0.1 and about 1.0 per cent by weight of the water.

In a preferred method of carrying out the invention, the crude triaryl phosphate to be purified is first melted, if it is not already molten, and is then added gradually with violent agitation to a relatively larger volume of water containing an emulsifying agent. The water is preferably also at a temperature above the solidification temperature of the crude phosphate before the latter is stirred in, although the water may be heated to the operating temperature in the early stages of the addition. When introduction of the compound to be purified is complete, the resulting dispersion is cooled, with agitation being continued, until the triaryl phosphate has solidified, usually in the form of crystals or fine granules which remain mechanically suspended in the water. The mixture is decanted or filtered to separate the solid triaryl phosphate. The latter is then washed once or twice with water, and is dried, after which it is ready for use.

The following example will further illustrate the invention but is not to be construed as limiting its scope.

Example

Tri-paratert.-butylphenyl phosphate was prepared as follows and then purified according to the invention. In the preparation step, 15.23 gram-mols of paratert.-butylphenol was melted and mixed with 11.4 grams of anhydrous magnesium chloride catalyst. A charge of 5.33 gram-mols of phosphorus oxychloride was added gradually with stirring at a temperature of 100° to 105° C. over a period of 1.3 hours. The resulting mixture was heated for another hour at 100°

C., raised slowly to 150° C., and maintained at the latter temperature for 3 hours more. Air was then blown through the molten mass for 0.7 hour to remove hydrogen chloride, producing a crude molten tri-paratert.-butylphenyl phosphate.

This molten material was then purified by pouring it gradually with agitation into 8 liters of water containing 20 grams of Grasselli 1N181P (a lauryl alcohol sulfate), the water being initially at a temperature of 85° C. The resulting smooth emulsion was then allowed to cool slowly, the agitation continuing. At about 79- C. coagulation started and within a short time the tri-paratert.-butylphenyl phosphate solidified to granules suspended in the water. This mixture was cooled to room temperature and filtered through a basket centrifuge. The residue, which was the desired product, was washed with water and dried in air. The yield of desired phosphate was practically quantitative. The material contained only 0.05 per cent acidity (as $H_3PO_4$) and melted to a clear, colorless liquid freezing at 96.2° C.

What is claimed is:

1. A method of separating triaryl phosphates from the impurities normally incident to their manufacture from the corresponding phenols and phosphorus oxychloride which comprises dispersing the crude molten triarylphosphate in water at a temperature sufficient to maintain the compound molten and containing a small proportion of an emulsifying agent, cooling the resulting dispersion to a temperature below the solidification temperature of the compound until the compound separates from the suspension as solid phase, and separating the solidified product from the cooled suspension.

2. In a process of preparing triaryl phosphates by the reaction of phenols with phosphorus oxychloride, the improved procedure for separating the triarylphosphate from the impurities normally present in the crude reaction product which comprises agitating the crude product while molten with a larger volume of water at a temperature above the solidification temperature of the crude compound and containing from 0.1 to 1.0 per cent by weight of an emulsifying agent to form a dispersion, cooling the resulting dispersion with agitation to a temperature below the solidification temperature of the compound until the latter separates from the dispersion as a finely-divided solid, filtering the cooled dispersion to separate the solid product, washing the solid thus separated, and thereafter drying it.

3. A method according to claim 2 wherein the triaryl phosphate is tri-paratertiarybutylphenyl phosphate.

4. A method according to claim 2 wherein the emulsifying agent is lauryl alcohol sulfate.

DONALD F. PONTZ.

REFERENCES CITED

The following references are of record in the file of this patent:

UNITED STATES PATENTS

| Number | Name | Date |
|---|---|---|
| 1,711,482 | Grossman | Apr. 30, 1929 |
| 2,182,817 | Moyle | Dec. 12, 1939 |
| 2,272,193 | Fisher et al. | Feb. 10, 1942 |